(12) United States Patent
Rendina et al.

(10) Patent No.: US 11,459,952 B2
(45) Date of Patent: Oct. 4, 2022

(54) AIR/OIL MIXTURE SEPARATION SYSTEMS FOR GAS TURBINE ENGINES

(71) Applicant: United Technologies Corporation, Farmington, CT (US)

(72) Inventors: Nicholas Rendina, Massapequa, NY (US); Denman H. James, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 351 days.

(21) Appl. No.: 16/718,504

(22) Filed: Dec. 18, 2019

(65) Prior Publication Data

US 2021/0189961 A1    Jun. 24, 2021

(51) Int. Cl.
*F02C 7/06* (2006.01)
*F01D 25/20* (2006.01)

(52) U.S. Cl.
CPC ............... *F02C 7/06* (2013.01); *F01D 25/20* (2013.01); *F05D 2260/98* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,016,977 A * | 1/1962 | Schweitzer | ............ | B64D 37/10 96/189 |
| 4,714,139 A * | 12/1987 | Lorenz | .................... | F16N 39/06 184/6.24 |
| 4,755,103 A * | 7/1988 | Streifinger | ............ | F04D 29/063 384/473 |
| 4,986,837 A * | 1/1991 | Shibata | .............. | B01D 19/0047 96/6 |
| 6,217,634 B1 * | 4/2001 | Dominelli | .......... | B01D 19/0031 96/6 |
| 6,398,833 B1 * | 6/2002 | Santerre | .................. | B01D 45/12 55/525 |
| 6,955,706 B2 * | 10/2005 | Varrin, Jr. | ............ | G21C 17/022 122/491 |
| 7,900,749 B2 * | 3/2011 | Regonini | ............... | B01D 45/14 55/337 |

(Continued)

OTHER PUBLICATIONS

European Search Report, European Application No. 20215707.9, dated May 10, 2021, European Patent Office; European Search Report 9 pages.

*Primary Examiner* — Michael R Mansen
*Assistant Examiner* — Mark K Buse
(74) *Attorney, Agent, or Firm* — Cantor Colburn LLP

(57) ABSTRACT

Oil lubrication systems for use on gas turbine engines are described. The systems include a conduit and an air/oil separator connected to and arranged along the conduit. The air/oil separator comprises includes a housing and a semi-permeable divider within the housing, the semi-permeable divider being permeable to air but not oil. The semi-permeable divider separates a first flow path of an air/oil mixture and a second flow path of low pressure such that air from the air/oil mixture passes through the semi-permeable divider and is removed from the air/oil mixture, and wherein an air-to-oil ratio is less at the second end of the first flow path as compared to the air-to-oil ratio at the first end of the first flow path.

14 Claims, 10 Drawing Sheets

(56) References Cited

U.S. PATENT DOCUMENTS

| | | | |
|---|---|---|---|
| 8,960,385 B2 | 2/2015 | Achenbach | |
| 9,168,475 B2 * | 10/2015 | Dorao | B01D 45/14 |
| 9,254,467 B2 | 2/2016 | Maruoka et al. | |
| 9,789,430 B2 | 10/2017 | Jackson | |
| 9,982,601 B2 | 5/2018 | Heims et al. | |
| 10,918,989 B2 * | 2/2021 | Brouillet | F02C 7/06 |
| 11,209,023 B2 * | 12/2021 | Duchateau | F04F 5/06 |
| 2005/0211093 A1 * | 9/2005 | Latulipe | B01D 50/20 55/400 |
| 2005/0230856 A1 * | 10/2005 | Parekh | C01B 13/0255 261/122.1 |
| 2007/0017370 A1 * | 1/2007 | Clausen | B01D 29/21 96/4 |
| 2012/0052266 A1 * | 3/2012 | Tee | B32B 27/32 427/205 |
| 2012/0181112 A1 | 7/2012 | Szolomayer et al. | |
| 2012/0324899 A1 * | 12/2012 | DiBenedetto | F01D 25/18 60/39.08 |
| 2015/0096839 A1 * | 4/2015 | Craig | F02C 7/06 184/6 |
| 2015/0329692 A1 * | 11/2015 | Stokes | B32B 27/00 442/164 |
| 2016/0138444 A1 * | 5/2016 | Prunera-Usach | F01M 13/04 74/431 |
| 2018/0304174 A1 | 10/2018 | Koehne et al. | |
| 2019/0195091 A1 | 6/2019 | Uhkoetter et al. | |

* cited by examiner

AIR/OIL MIXTURE SEPARATION SYSTEMS FOR GAS TURBINE ENGINES

BACKGROUND

The subject matter disclosed herein generally relates to gas turbine engines and, more particularly, to air/oil mixture separation systems for use in gas turbine engines.

Gas turbine engines may include oil systems to lubricate moving parts. The oil systems may include oil coolers, oil pumps, and conduits to cool and transport the oil throughout the gas turbine engine. The lubricating oil within the gas turbine engine typically will mix with air in various bearing chambers. Such air may be present both in a physically dispersed state as well as in solution in the liquid oil. It is desirable to remove the air from the oil. Typically, methods and mechanisms for air/oil separation have focused on mechanical separation of the liquid and gas. However, some components may have a need for oil with less entrained and dissolved gas than is possible through mechanical separation. Accordingly, improved air/oil separation is desirable.

SUMMARY

According to some embodiments, oil lubrication systems for use on gas turbine engines are provided. The systems include a conduit configured to convey an air/oil mixture therethrough and an air/oil separator connected to the conduit and arranged such that a portion of the conduit fluidly connects to the air/oil separator at an upstream end of the air/oil separator and another portion of the conduit fluidly connects to the air/oil separator at a downstream end of the air/oil separator. The air/oil separator includes a housing and a semi-permeable divider within the housing, the semi-permeable divider being permeable to air but not oil. The semi-permeable divider separates a first flow path and a second flow path. The first flow path is configured to receive and convey the air/oil mixture from a first end of the first flow path to a second end of the first flow path. The second flow path defines a low pressure, with the low pressure being less than a fluid pressure of the air/oil mixture such that air from the air/oil mixture passes through the semi-permeable divider and is removed from the air/oil mixture. An air-to-oil ratio is less at the second end of the first flow path as compared to the air-to-oil ratio at the first end of the first flow path.

In addition to one or more of the features described above, or as an alternative, further embodiments of the oil lubrication systems may include that the semi-permeable divider is defined by a plurality of tubes extending from the first end to the second end of the first flow path.

In addition to one or more of the features described above, or as an alternative, further embodiments of the oil lubrication systems may include that the housing defines a low-pressure chamber with the plurality of tubes extending through the low-pressure chamber.

In addition to one or more of the features described above, or as an alternative, further embodiments of the oil lubrication systems may include that the low pressure is near-vacuum.

In addition to one or more of the features described above, or as an alternative, further embodiments of the oil lubrication systems may include that the semi-permeable divider includes an oleophobic coating.

In addition to one or more of the features described above, or as an alternative, further embodiments of the oil lubrication systems may include that the oleophobic coating is a fluoroacrylic copolymer or a perfluoropolyether In addition to one or more of the features described above, or as an alternative, further embodiments of the oil lubrication systems may include a component arranged upstream of the air/oil separator along the conduit, wherein an output of air and oil is directed to the air/oil separator from the component.

In addition to one or more of the features described above, or as an alternative, further embodiments of the oil lubrication systems may include that the component is a damper.

In addition to one or more of the features described above, or as an alternative, further embodiments of the oil lubrication systems may include a plurality of additional air/oil separators arranged along the conduit.

In addition to one or more of the features described above, or as an alternative, further embodiments of the oil lubrication systems may include an oil pump fluidly connected to the conduit and an oil tank fluidly connected to the conduit. An output from the air/oil separator is directed into the oil tank.

According to some embodiments, gas turbine engines are provided. The gas turbine engines include a conduit configured to convey an air/oil mixture therethrough, a component arranged along the conduit and configured to receive the air/oil mixture, and an air/oil separator connected to the conduit and arranged such that a portion of the conduit fluidly connects to the air/oil separator at an upstream end of the air/oil separator and another portion of the conduit fluidly connects to the air/oil separator at a downstream end of the air/oil separator. The air/oil separator includes a housing and a semi-permeable divider within the housing, the semi-permeable divider being permeable to air but not oil. The semi-permeable divider separates a first flow path and a second flow path. The first flow path is configured to receive and convey the air/oil mixture from a first end of the first flow path to a second end of the first flow path. The second flow path defines a low pressure, with the low pressure being less than a fluid pressure of the air/oil mixture such that air from the air/oil mixture passes through the semi-permeable divider and is removed from the air/oil mixture. An air-to-oil ratio is less at the second end of the first flow path as compared to the air-to-oil ratio at the first end of the first flow path.

In addition to one or more of the features described above, or as an alternative, further embodiments of the gas turbine engines may include that the semi-permeable divider is defined by a plurality of tubes extending from the first end to the second end of the first flow path.

In addition to one or more of the features described above, or as an alternative, further embodiments of the gas turbine engines may include that the housing defines a low-pressure chamber with the plurality of tubes extending through the low-pressure chamber.

In addition to one or more of the features described above, or as an alternative, further embodiments of the gas turbine engines may include that the low pressure is near-vacuum.

In addition to one or more of the features described above, or as an alternative, further embodiments of the gas turbine engines may include that the semi-permeable divider includes an oleophobic coating.

In addition to one or more of the features described above, or as an alternative, further embodiments of the gas turbine engines may include that the oleophobic coating is a fluoroacrylic copolymer or a perfluoropolyether In addition to one or more of the features described above, or as an alternative, further embodiments of the gas turbine engines may include that the component is arranged upstream of the air/oil separator along the conduit, and wherein an output of air and oil is directed to the air/oil separator from the component.

In addition to one or more of the features described above, or as an alternative, further embodiments of the gas turbine engines may include that the component is a damper.

In addition to one or more of the features described above, or as an alternative, further embodiments of the gas turbine engines may include a plurality of additional air/oil separators arranged along the conduit.

In addition to one or more of the features described above, or as an alternative, further embodiments of the gas turbine engines may include an oil pump fluidly connected to the conduit and an oil tank fluidly connected to the conduit. An output from the air/oil separator is directed into the oil tank.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
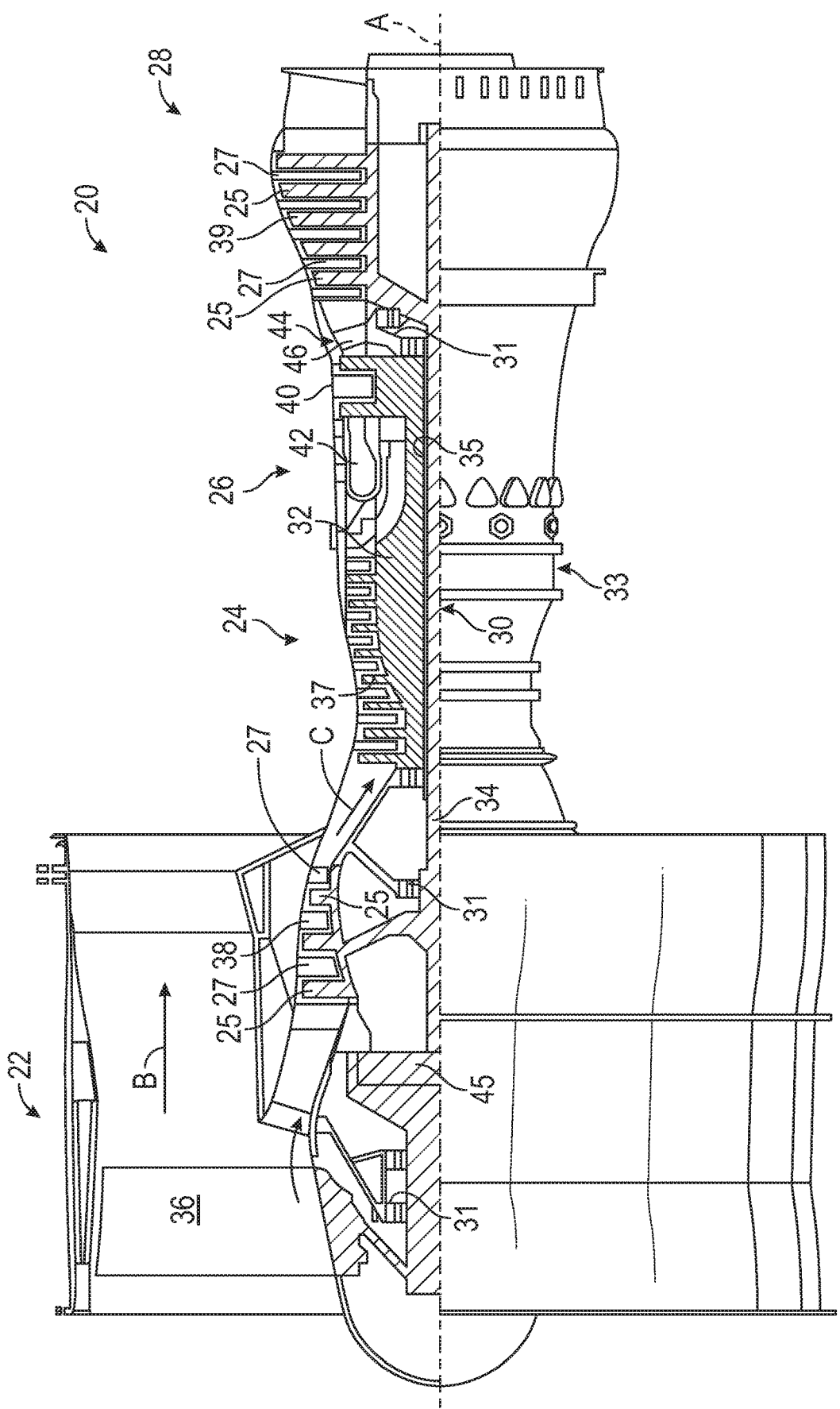
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42, and is then expanded over the high-pressure turbine 40 and the low-pressure turbine 39. The high-pressure turbine 40 and the low-pressure turbine 39 rotationally drive the respective high-speed spool 32 and the low-speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration. For example, the teachings provided herein may be applied to other types of engines. Some such example alternative engines may include, without limitation, turbojets, turboshafts, and other turbofan configurations (e.g., wherein an intermediate spool includes an intermediate pressure compressor ("IPC") between a low-pressure compressor ("LPC") and a high-pressure compressor ("HPC"), and an intermediate pressure turbine ("IPT") between the high-pressure turbine ("HPT") and the low-pressure turbine ("LPT")).

Figure 2:
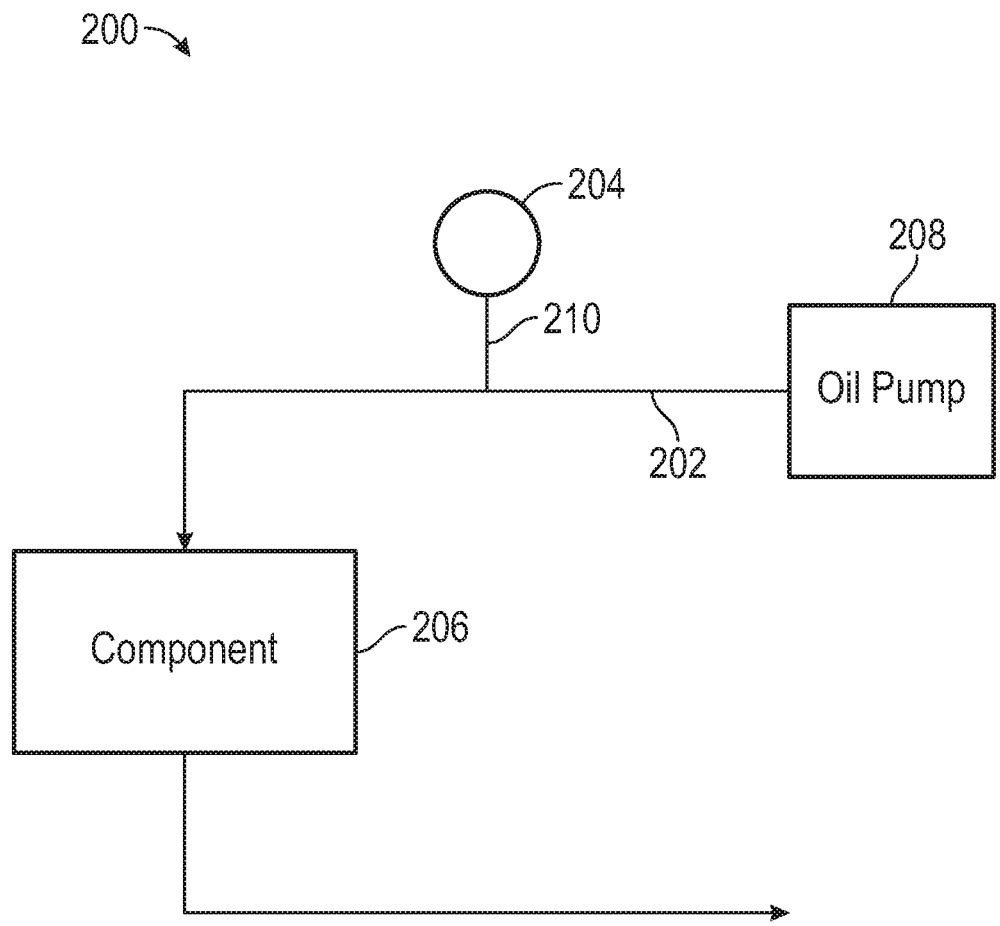
FIG. 2 is a schematic diagram of a portion of an oil lubrication system of a gas turbine engine.

Turning now to FIG. 2, a schematic diagram of a portion of an oil lubrication system 200 is shown. The oil lubrication system 200 includes a conduit 202 through which oil may pass. The conduit 202 may be tubing formed from a material suitable to carry oil, such as, for example, stainless steel. The conduit 202, as schematically shown, is arranged in fluid communication with damper 204 and an oil component 206 of a gas turbine engine. In this illustrative configuration, the damper 204 is fluidly coupled at an inlet side of the oil component 206 along the conduit 202. The oil component 206 may be an oil-air heat exchanger, an oil-oil heat exchanger, an oil pump, a filter, a damper, or any other component of an oil system for use on or in gas turbine engines, as will be appreciate by those of skill in the art. Further, in some configurations, multiple oil components 206 may be arranged along the conduit 202. Oil may pass from an oil pump 208, through the conduit 202, and into the oil component 206. The conduit 202 may be in fluid communication with the damper 204 through an adapter 210. In that regard, the adapter 210 may define a passage for oil to pass into and out of damper 204. In some configurations, the damper 204 may be a squeeze film damper, although other types of dampers may be employed without departing from the scope of the present disclosure.

Figure 3:
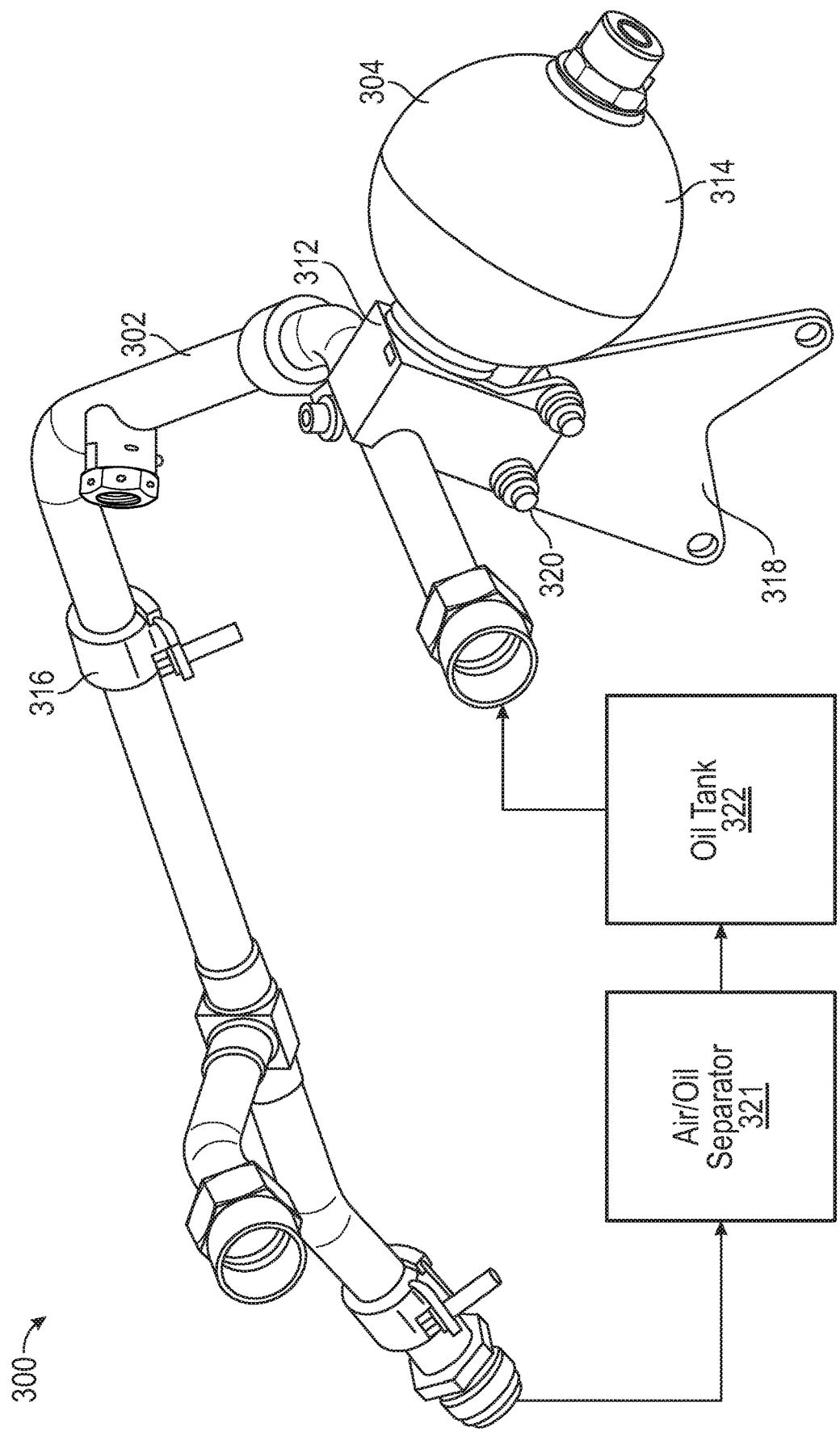
FIG. 3 is a schematic illustration of a portion of an oil lubrication system of a gas turbine engine.

Turning now to FIG. 3, a schematic illustration of a portion of an oil lubrication system 300 is shown. The oil lubrication system 300 includes a conduit 302 and a damper 304 that are mechanically coupled by an adapter 312. The damper 304 includes a housing 314. The housing 314 is depicted as having a spherical geometry but, in various embodiments, the damper may have other geometries such as cubic, rectangular, pyramid, conical, cylindrical, or other suitable geometries for providing a volume in which oil is able to expand. In operation, a pump (not shown) may cause oil to flow through the conduit 302, into the adapter 312, and into the damper 314, such as in response to a pressure pulse exerted on the oil. The housing 312 of the damper 304 may be formed using a rigid material such as aluminum, stainless steel, other metals, thermoplastics, or other suitable rigid material, as will be appreciated by those of skill in the art. The damper 304 may be coupled to the adapter 312 by mechanical attachment, such as threads, or permanent attachment methods for metallic materials, such as welding. The adapter 312 may be welded to the conduit 302, and an internal passage or cavity of the adapter 312 can be fluidly connected to the conduit 302.

As shown, one or more conduit mounting brackets 316 may provide a mounting point to secure the conduit 302 in an engine compartment or other component of a gas turbine ending. Additionally, one or more adapter mounting brackets 318 may be coupled to the adapter 312 by one or more fasteners 320. The adapter mounting brackets 318 can be configured to mechanically couple the adapter 312 and the damper 304 to a desired mounting location within a gas turbine engine.

The conduit 302 is configured to transfer or enable fluid flow of oil and/or an air/oil mixture therethrough. The air/oil mixture may be directed to an air/oil separator 321, which separates the air from the oil prior to passing the oil back into an oil tank 322. The air/oil separator 321 may be part of a scavenge and conditioning system of a gas turbine engine, as will be appreciated by those of skill in the art. A portion of the oil within the oil tank 322 may then be pumped into the conduit 302 and supplied to the damper 304 and/or other compartments or components of a gas turbine engine, to provide lubrication, cooling, thermal transfer, etc., as will be appreciated by those of skill in the art.

Although FIG. 3 is illustrative of an accumulator-type damper, it will be appreciated that other types of dampers may be employed without departing from the scope of the present disclosure. For example, in some configurations, a squeeze-film damper that is arranged to control rotor motion within the gas turbine engine may be arranged along and fluidly connected to the conduit 302. In such configurations, the oil may be supplied into one or more annular fluid plenums, and provided to, for example, squeeze film cylinders and to form thin oil films that surround, for example, journal bearings.

FIGS. 2-3 are illustrative of portions of oil lubrication systems that may incorporate embodiments of the present disclosure. During the operation of the gas turbine engine, and specifically a lubrication system, an air/oil mixture is created or generated within various compartments that are supplied with the oil for lubrication (e.g., dampers, bearings, etc.). The air/oil mixture will be scavenged from the compartments/components and is required to be separated prior to returning to a supply system (e.g., oil tank and supporting components used for lubrication the lubrication system). In conventional systems, a mechanical separator (e.g., a multi-attitude deaerator (MAD)) is used to perform the separation of the air from the oil, with the oil being presented to the oil tank (or other reservoir) and the air typically being vented overboard through a breather or other mechanism. However, such mechanical separator systems have inefficiencies at certain pressures, flows, and attitudes. Due to these inefficiencies, insufficient air removal occur. If enough air is not removed from the oil, there poses downstream reduced flow, which can lead to higher component temperatures or insufficient lubrication. Additionally, the presence of air in the oil may cause the air/oil mixture to be more compressible than desired for use in a squeeze film damper. Efficiency in separation of the air (which is vented overboard) from the liquid oil is also desirable to reduce engine oil consumption. Accordingly, it is advantageous to develop more efficient and reliable oil lubrication systems and specifically air/oil separation systems thereof.

Typically, the mechanical separator systems include a component or structure to which an air/oil mixture is directed and supplied. Within the component, mechanical methods are used to separate the air out of the mixture. Accordingly, such systems may add weight to an aircraft, which may be undesirable, and further because of the mechanical nature of how such systems work, the above-identified inefficiencies may result.

Embodiments of the present disclosure are directed to improved efficiency air/oil separators for use with oil lubrication systems of gas turbine engines. In accordance with embodiments of the present disclosure, the air/oil mixture can be separated through the process of membrane degasification. In accordance with some embodiments, a semipermeable membrane is arranged to divide the air/oil mixture from an independent low-pressure air stream, with two flows running adjacent to each other and separated by the semipermeable membrane. A pressure differential between the low-pressure air stream and the relatively high-pressure air/oil mixture will drive mass transfer from the air/oil mixture to the air stream through the semipermeable membrane. A pressure differential will be balanced by the characteristics of the membrane separator, such as pore size, surface area, fluid properties, etc. Keeping system characteristics and pore size constant result in a relationship such that lower pressure differentials requires a larger membrane surface area to achieve the same separation. In some embodiments, the pressure differential may be ambient or higher within the fluid and at vacuum or near vacuum within the low-pressure air stream. As such, the pressure differential may be maximized to achieve a desired air extraction. In some embodiments, the membrane (or flow paths therethrough) may be sized to only allow air molecules to pass through into the air stream and not allow oil molecules to pass. Additionally, in some embodiments, the membranes or material of the divider between the air/oil mixture and the low-pressure air stream may be coated with an oleophobic coating in order to deter oil from passing through the divider. Such coatings may enable larger pore sizes, such as pore sizes that are larger than the molecular size of air and oil molecules. As such, the membrane enables filtering and extracting the air out of the air/oil mixture as is passes through the air/oil separator.

In some embodiments, a flow of the air/oil mixture may be divided upon entering the air/oil separator in order to optimize the contact of the air/oil mixture with the surface area of the membrane. Advantageously, depending on system (e.g., engine) characteristics and/or properties, including, for example, the quality of the air/oil mixture entering the air/oil separator, a type of membrane, and a flow area, the specific sizing and/or geometry of the air/oil separator can be determined.

Figure 4:
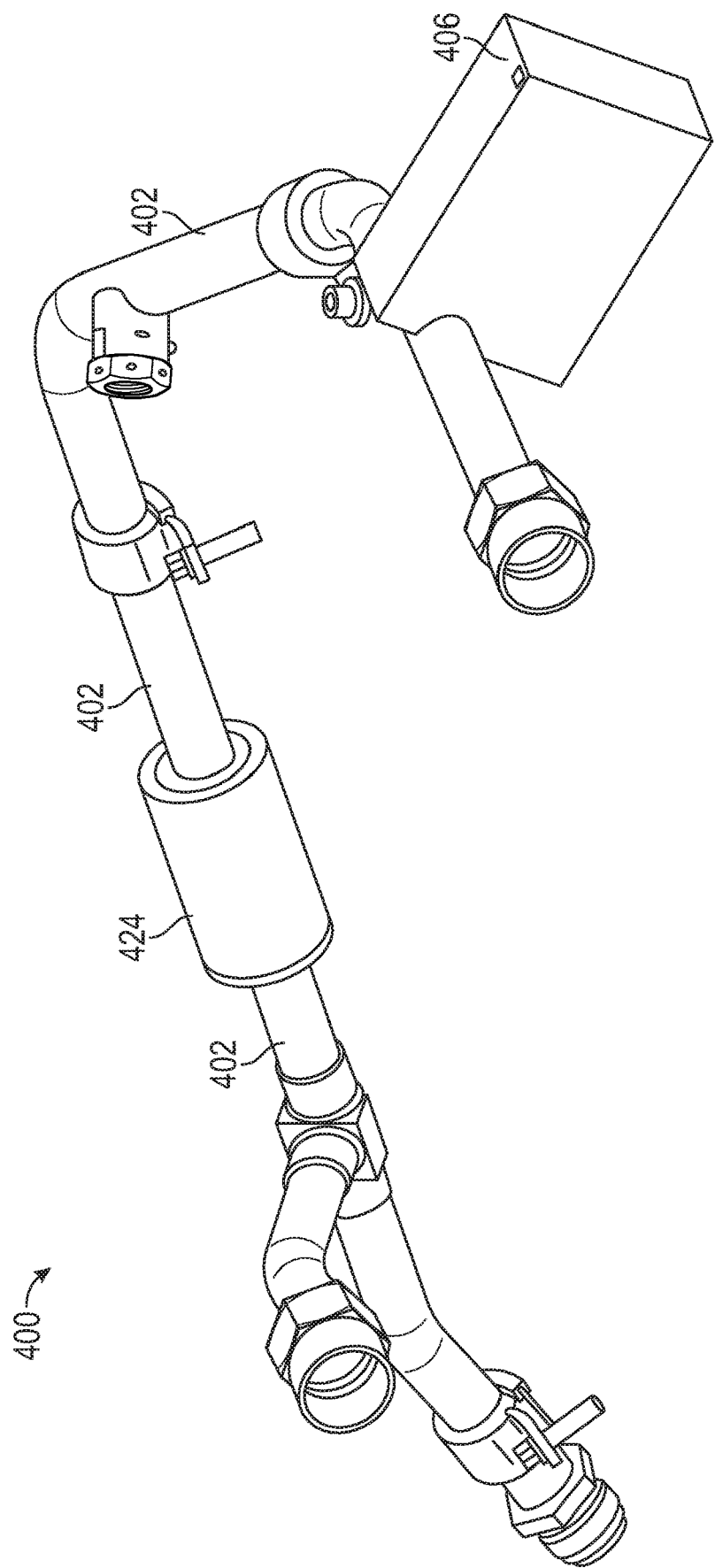
FIG. 4 is a schematic illustration of a portion of an oil lubrication system of a gas turbine engine in accordance with an embodiment of the present disclosure.

Turning now to FIG. 4, a schematic illustration of a portion of an oil lubrication system 400 in accordance with an embodiment of the present disclosure is shown. The oil lubrication system 400 includes a conduit 402 and a component 406 coupled and fluidly connected to the conduit 402. The component 406 may be a damper, a bearing, a sensor, a compartment, etc., as will be appreciated by those of skill in the art. In operation, a pump (not shown) may cause oil to flow through the conduit 402 and into the component 406, such as in response to a pressure pulse exerted on the oil by the pump. Oil may be cycled through the system, with a pump and oil tank, as described above.

In this configuration, rather than employing a separate and distinct air/oil separator, the conduit 402 is configured with an integrated air/oil separator 424. The air/oil separator 424 is directly incorporated into or otherwise connected to the conduit 402 such that a flow of an air/oil mixture through the conduit 402 will pass through the air/oil separator 424. At an inlet side of the air/oil separator 424, an air/oil mixture will enter from the conduit 402, and at an outlet side of the air/oil separator 424, fluid having a reduced air content will reenter the conduit 402 downstream of the air/oil separator 424. The air/oil separator 424 may take various forms, and the illustrative embodiment is not to be limiting.

Figure 5:
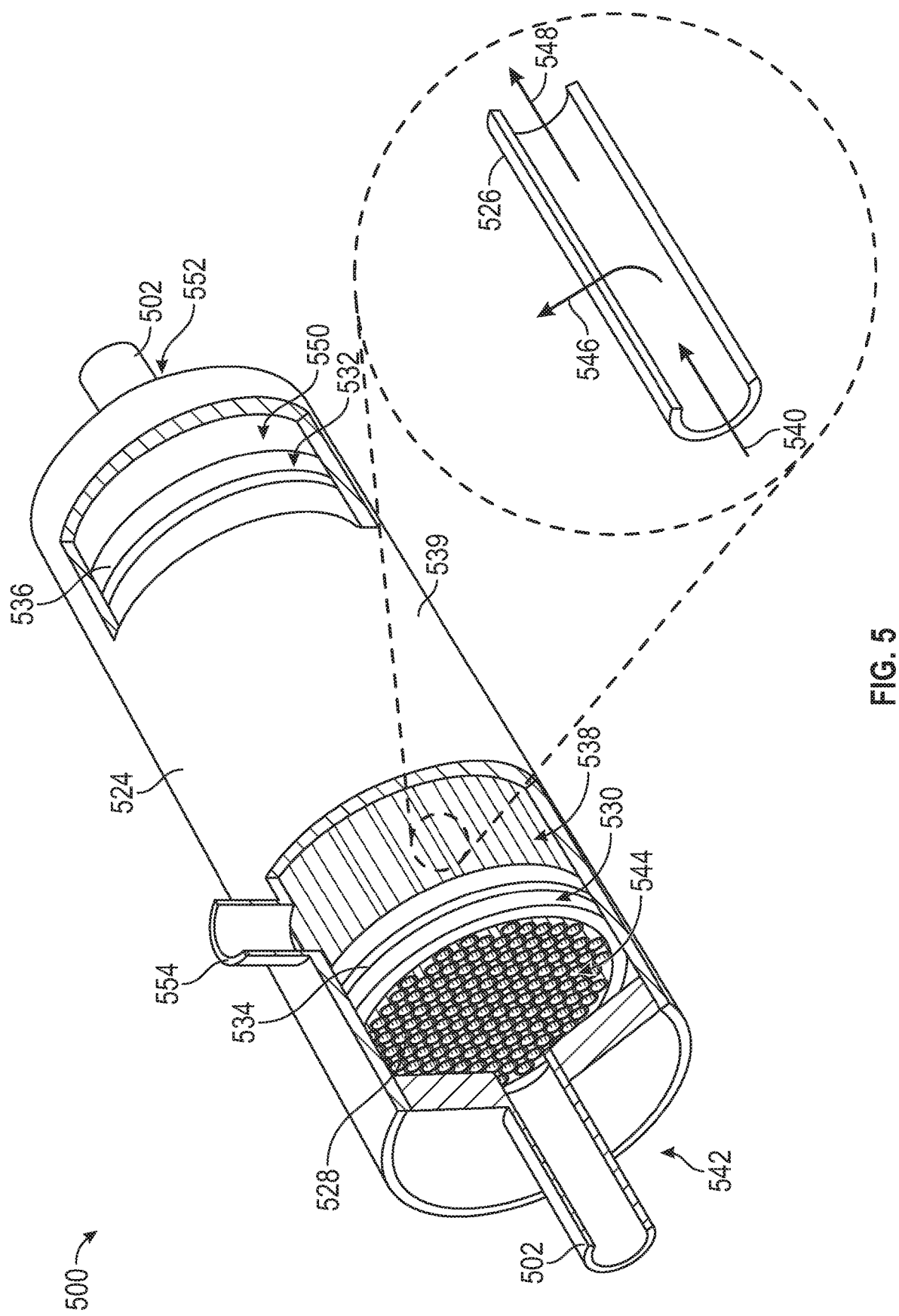
FIG. 5 is a schematic illustration of an air/oil separator in accordance with an embodiment of the present disclosure.

Turning now to FIG. 5, a schematic depiction of an air/oil separator 524 in accordance with an embodiment of the present disclosure is shown. The air/oil separator 524 may be part of an oil lubrication system 500 and arranged along a conduit 502, similar to that shown and described above. In this embodiment, the air/oil separator 524 includes a plurality of tubes 526 that are surrounded by a low pressure air, e.g., a low pressure air cavity with the tubes 526 passing therethrough. The tubes 526 are arranged as a separator bundle 528 that extends from a first end 530 to a second end 532. At the first end 530 of the separator bundle 528 is a first end seal 534 and at the second end 532 of the separator bundle 528 is a second end seal 536. The first and second end seals 534, 536 define a low-pressure chamber 538 within a housing 539, with the tubes 526 extending therethrough. The tubes 526 are semipermeable, and specifically are permeable to air, but not to oil (which may be achieved based on pore sizes, coatings, etc.).

The housing 539 is configured to integrate into the conduit 502. For example, the housing 539 may include joints, connectors, fasteners, engaging mechanisms, etc. to enable a fluid-tight connection between the air/oil separator 524 and the conduit 502. In some embodiments, the material of the conduit 502 may be continuous or integral with the material of the housing 539 such that the conduit 502 and the housing 539 are a single unitary piece or continuous material (e.g., by additive manufacturing). The housing 539 may be a type of pressure vessel to ensure operation at desired operating conditions (e.g., pressures, temperatures, etc.). The seal 534, 536 are configured to engage with an interior surface of the housing 539 in this illustrative embodiment.

An air/oil mixture 540 (shown in the enlarged portion of FIG. 5) will flow through the conduit 502 and into an upstream end 542 of the air/oil separator 524 into an upstream chamber 544. The air/oil mixture 540 will then flow into the various tubes 526 of the separator bundle 528, and flow from the first end 530 to the second end 532. As the air/oil mixture 540 flows through the tubes 526, the air 546 will be extracted from the air/oil mixture 540, resulting in a reduced air content oil 548. The reduced air content oil 548 will exit the tubes 526 of the separator bundle 528, enter a downstream chamber 550, and subsequently flow back into the conduit 502 at a downstream end 552 of the air/oil separator 524.

The air 546 that is extracted from the tubes 526 will enter the low-pressure chamber 538 and subsequently flow out an air outlet 554 of the air/oil separator 524. The air outlet 554 may be fluidly connected to other components or locations on a gas turbine engine or on an aircraft, or may be dumped overboard. In some embodiments, a pump may be used to ensure a low pressure is maintained within the low-pressure chamber 538.

In operation, the low pressure of the low-pressure chamber 538 provides for a pressure differential with respect to the air/oil mixture 540. As such, the pressure differential will cause the particles and molecules of the air/oil mixture 540 to tend to be directed outward through the material of the tubes 526. The tubes 526 are configured to permit the passage of air, but not oil, thus enables the separation of air from the air/oil mixture 540. Stated another way, the material properties of the tubes 526 is selected or configured to be permeable or porous to air, but impermeable to oil. To achieve such separation, pore size, coatings, materials, etc. can be selected for the tubes 526 to permit flow of air but prevent oil from passing therethrough. For example, the tubes 526 may be coated with an oleophobic material or coating which will prevent the oil from passing through pores or passages within the tubes 526. It will be appreciated that the pores or passages of the tubes 526 that enable the passage of air therethrough are generally radial in direction. That is, the air/oil mixture is contained within the tubes 526 and the air will flow radially outward through the wall or structure of the tubes 526.

Pore sizes of the membranes may be based on specific uses (e.g., oil types, air/oil mixture levels, desired extraction amounts/efficiencies, etc.). For example, without limitation, pore sizes may be ranged from about 1000 µm to about 0.0001 µm. Further, it will be appreciated that smaller pore sizes may be employed to restrict oil from passing through a material (but allowing air) at the molecular level. Further, in addition to pore sizes, oleophoic coatings may be used to aid in preventing oil from passing through to the low-pressure air stream. For example, such coatings may be, without limitation, fluoroacrylic copolymers, perfluoropolyethers, and combinations thereof.

The low-pressure chamber 538 is configured to define a portion (e.g., chamber, cavity, space, etc.) that is at sufficiently lower pressure than the pressure of the air/oil mixture 540 to cause the air to be extracted therefrom. In some embodiments, the low-pressure chamber 538 may be maintained at a vacuum or near vacuum. In some embodiments, the diameter of the tubes 526 may be selected to ensure a specific or sufficiently high fluid pressure of the air/oil mixture 540 (i.e., relative to the low-pressure chamber 538).

Although shown and described in FIG. 5 with a specific configuration, those of skill in the art will appreciate that other arrangements may be possible without departing from the scope of the present disclosure. For example, a substantially opposite configuration may be possible, wherein a number of hollow tubes are passed through a conduit or chamber full of the air/oil mixture, and the hollow tubes are maintained at a low pressure (e.g., vacuum or near-vacuum).

Figure 6:
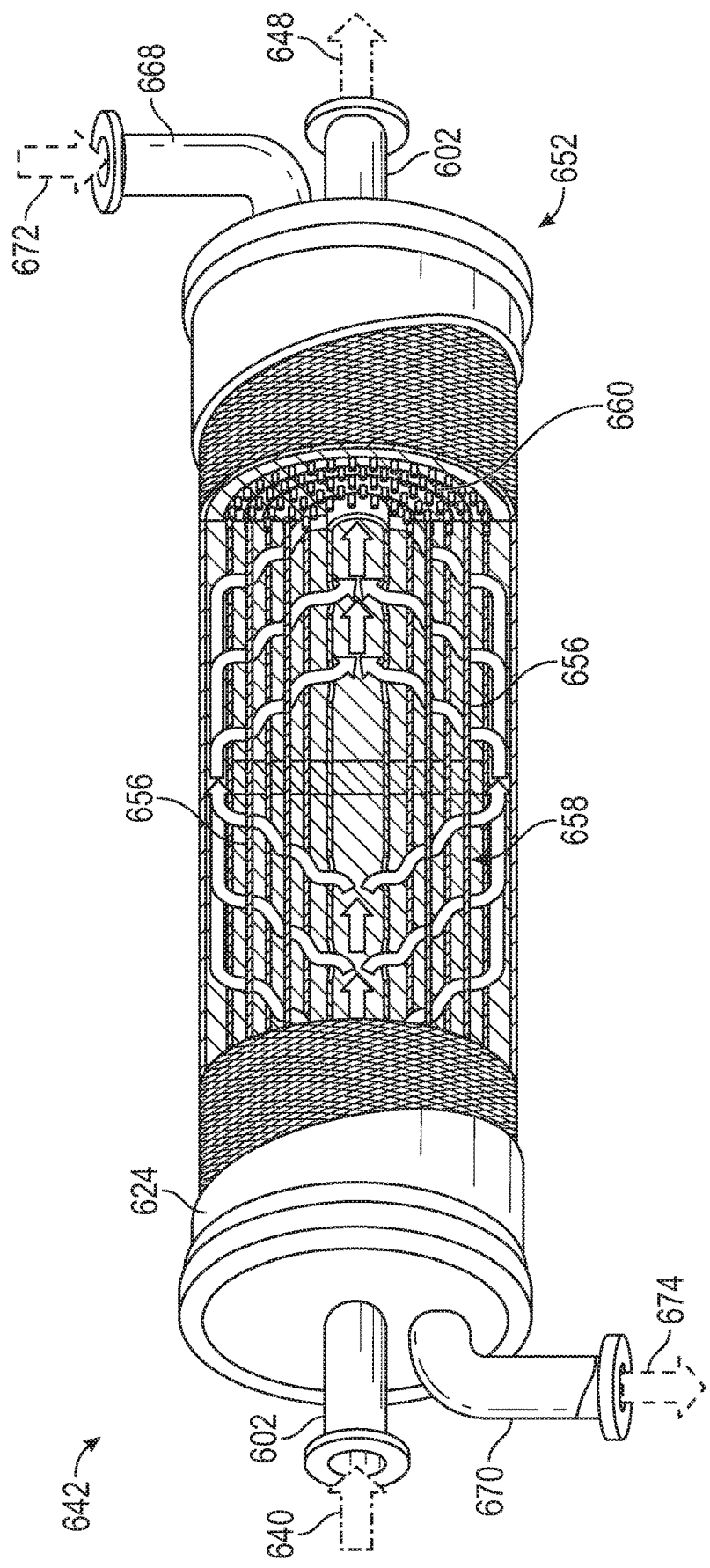
FIG. 6 is a schematic illustration of an air/oil separator in accordance with an embodiment of the present disclosure.

For example, turning now to FIG. 6, a schematic depiction of an air/oil separator 624 in accordance with an embodiment of the present disclosure is shown. The air/oil separator 624 may be part of an oil lubrication system and arranged along a conduit 602, similar to that shown and described above. In this embodiment, the air/oil separator 624 includes a plurality of tubes 656 that are surrounded fluid (i.e., an air/oil mixture). The tubes 656 pass through a fluid chamber 658. The fluid chamber 658 is fluidly connected to the conduit 602 at an upstream end 642 and a downstream end 652 of the air/oil separator 624. The tubes 656 are arranged as a separator bundle 660 that extend from an inlet 668 to an outlet 670.

In this embodiment, a low-pressure gas 672 is input at the inlet 668, flows through the tubes 656, and an air-rich gas 674 will exit at the outlet 670. In some embodiments, the low-pressure gas 672 may be at near-vacuum pressures when entering the inlet 668. At the same time, an air/oil mixture 640 will enter the air/oil separator 624 at the upstream end 642 and flow through the fluid chamber 658 to the downstream end 652 and a reduced air content oil 648 will exit the fluid chamber 658. As the air/oil mixture 640 passes through the fluid chamber 658, the air/oil mixture 640 will surround and contact the tubes 656 and the low pressure within the tubes 656 will extract at least a portion of the air within the air/oil mixture 640, similar to that described above.

As described above, the air/oil separators of the present disclosure include a housing that defines two separate flow paths therethrough. A first flow path conveys an air/oil mixture through the air/oil separator, with a relatively high air-content mixture at an upstream or inlet side and a relatively low air-content mixture exiting at a downstream or outlet side. A second flow path is a low-pressure flow path that is at or near vacuum and is configured to extract at least a portion of the air from the air/oil mixture that passes through the first flow path. The first flow path (air/oil mixture) may be through tubes or other conduits with the second flow path (low pressure) surrounding such first flow path (e.g., as shown in FIG. 5), or vice versa, with the first flow path (air/oil mixture) surrounding the second flow path (low pressure). As discussed herein, the flow paths are not required to be tubular, but can take any shape, such as to maximize a surface area of contact between the two flow paths. Further, the direction of flow through the two flow paths may be controlled, such that they are parallel directional flows (e.g., enter and exit at same general end), counter-flow directional flows (e.g., enter and exit at opposite ends), or various cross-flows (e.g., flows are generally perpendicular to each other). The direction of flow may be based on the structural arrangement of the features that define the flows. For example, tubular configurations may be preferred for parallel and/or counter-flows, whereas a cross-flow configuration may be implemented using plate-based passages (e.g., with fins for maximized surface area).

To achieve the desired air/oil separation, a semi-permeable divider separates the first flow path and the second flow path. In the above-described embodiments, the semi-permeable divider takes the form of tubes passing through a housing. The semi-permeable divider is permeable to air but not to oil, thus enabling the degassing or air extraction from the oil, and thereby generating a low- or no-air content oil at an output or outlet of the air/oil separator. The semi-permeable divider separates a relatively high-pressure fluid (i.e., the air/oil mixture) and a relative low-pressure fluid or space (e.g., low-pressure air, near vacuum, or vacuum). As a result, an air-to-oil ratio is greater at a first end of the first flow path as compared to at a second end of the first flow path. Separation efficiency, or the amount of air removed from the oil, will vary based on operating conditions, starting air/oil ratio, pressure differential, membrane surface area, and membrane characteristics. In accordance with some embodiments, the various characteristics may be set or selective to achieve a removal of greater than 80% of the air from the air/oil mixture.

Figure 7:
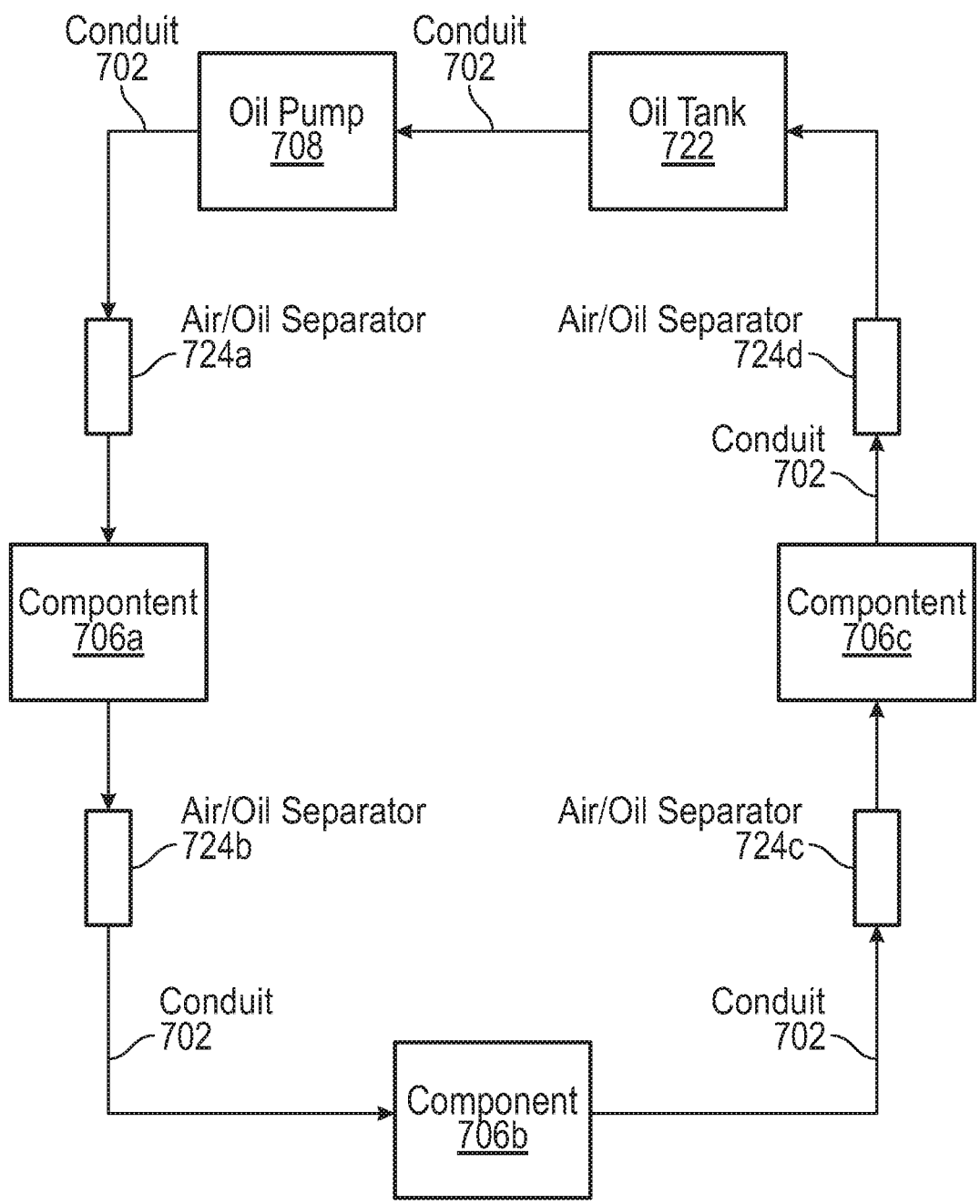
FIG. 7 is a schematic diagram of an oil lubrication system in accordance with an embodiment of the present disclosure.

Turning now to FIG. 7, a schematic illustration of an oil lubrication system 700 in accordance with an embodiment of the present disclosure is shown. The oil lubrication system 700 includes a conduit 702 and a number of components 706a-706c arranged along the conduit 702. Those of skill in the art will appreciate the components 706a-706c may be dampers, sensors, bearings, compartments, etc. In operation, an oil pump 708 drives an oil flow from an oil tank 722 through the conduit 702 and into the components 706a-706c, such as in response to a pressure pulse exerted on the oil by the oil pump 708. As the oil is passed through the components 706a-706c, the oil may accumulate air, thus generating an air/oil mixture at the output of each component 706a-706c. In this embodiment, each component 706a-706c may be associated with an upstream air/oil separator and/or a downstream air/oil separator, shown as air/oil separators 724a-724d. As such, an oil input to each component 706a-706c may be refined or de-gassed, prior to the oil entering the respective component 706a-706c and/or an air/oil mixture that exits a respective component 706a-706c may be refined or degassed by a downstream a respective air/oil separator of the air/oil separators 724a-724d.

Such multi-air/oil separator configurations provide various benefits. For example, an air-content can be catered to each component prior to oil entering such component. Further, because a number of relatively small air/oil separators may be integrated directly into the conduit, a large air/oil separator may not be required anywhere within the system. Moreover, such continuous processing by each subsequent air/oil separator, may enable a very low-air content oil to be supplied back into the oil tank after use.

Figure 8:
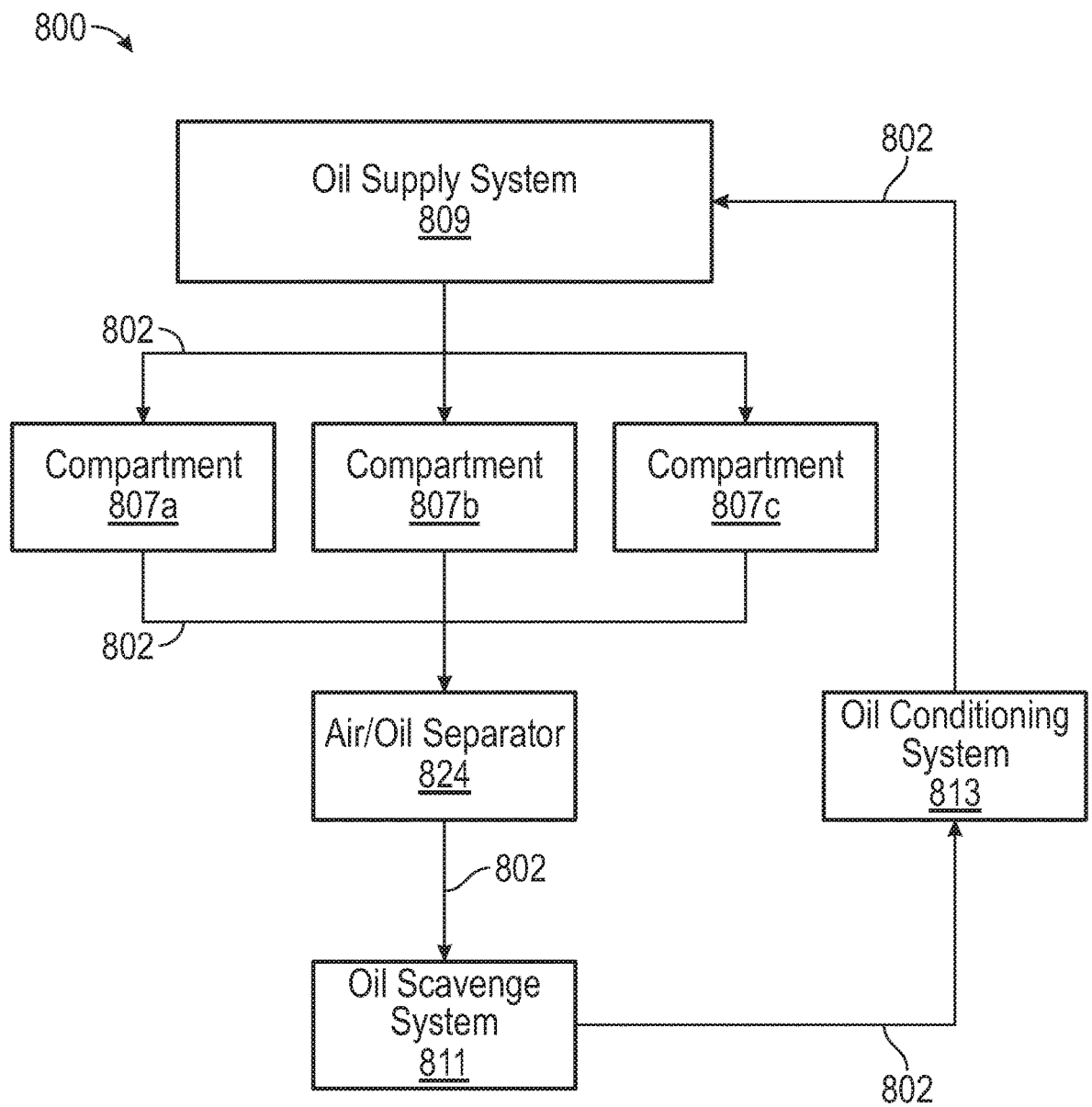
FIG. 8 is a schematic diagram of an oil lubrication system in accordance with an embodiment of the present disclosure.

Turning now to FIG. 8, a schematic illustration of an oil lubrication system 800 in accordance with an embodiment of the present disclosure is shown. The oil lubrication system 800 includes a conduit 802 and a number of compartments 807a-807c arranged along the conduit 802, in parallel (as compared to the series configuration shown in FIG. 7). The compartments 807a-807c may be compartments or volumes that receive oil for lubrication (e.g., for dampers, sensors, bearings, etc.), as will be appreciated by those of skill in the art. In operation, an oil supply system 809 can drive an oil flow from an oil tank of the oil supply system 809 through the conduit 802 and into the compartments 807a-807c. As the oil is passed through the compartments 807a-807c, the oil may accumulate air, thus generating an air/oil mixture at the output of each compartments 807a-807c. In this embodiment, each compartment 807a-807c is arranged upstream of an air/oil separator 824. As such, the output from all of the compartments 807a-807c may be refined or de-gassed prior to the oil entering an oil scavenge system 811. In some embodiments, the air/oil separator 824 may be part of the oil scavenge system 811, and thus the illustrative configuration shown in FIG. 8 is not to be limiting. The oil scavenge system 811 is configured to receive the oil after air removal at the air/oil separator 824 and will supply such scavenged oil to an oil conditioning system 813 and back to the oil supply system 809.

Figure 9:
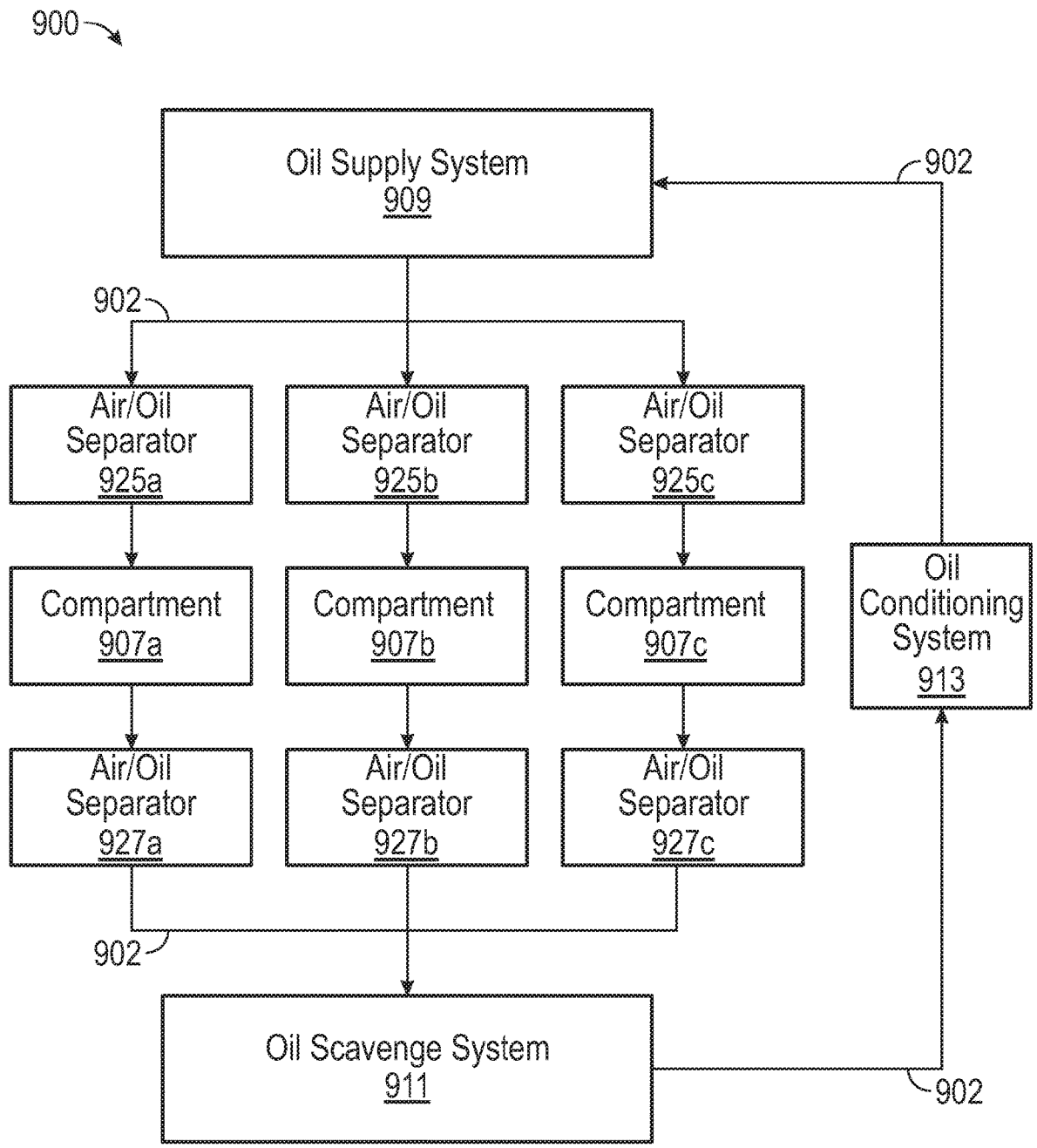
FIG. 9 is a schematic diagram of an oil lubrication system in accordance with an embodiment of the present disclosure.

Turning now to FIG. 9, a schematic illustration of an oil lubrication system 900 in accordance with an embodiment of the present disclosure is shown. The oil lubrication system 900 includes a conduit 902 and a number of compartments 907a-907c arranged along the conduit 902, in parallel (as compared to the series configuration shown in FIG. 7). The compartments 907a-907c may be compartments or volumes that receive oil for lubrication (e.g., for dampers, sensors, bearings, etc.), as will be appreciated by those of skill in the art. In operation, an oil supply system 909 can drive an oil flow from an oil tank of the oil supply system 909 through the conduit 902 and into the compartments 907a-907c. As the oil is passed through the compartments 907a-907c, the oil may accumulate air, thus generating an air/oil mixture at the output of each compartments 907a-907c. In this embodiment, each compartment 907a-907c is arranged downstream of a respective first air/oil separator 925a-925c and upstream of a respective second air/oil separator 927a-927c. As such, each of the compartments 907a-907c may have an oil or air/oil mixture refined or de-gassed prior to the oil entering the respective compartments 907a-907c and then subsequently prior to entering an oil scavenge system 911. In some embodiments, the air/oil separators 927a-927c may be part of the oil scavenge system 911, and thus the illustrative configuration shown in FIG. 9 is not to be limiting. The oil scavenge system 911 is configured to receive the oil after air removal at the second air/oil separators 927a-927c and will supply such scavenged oil to an oil conditioning system 913 and back to the oil supply system 909.

Figure 10:
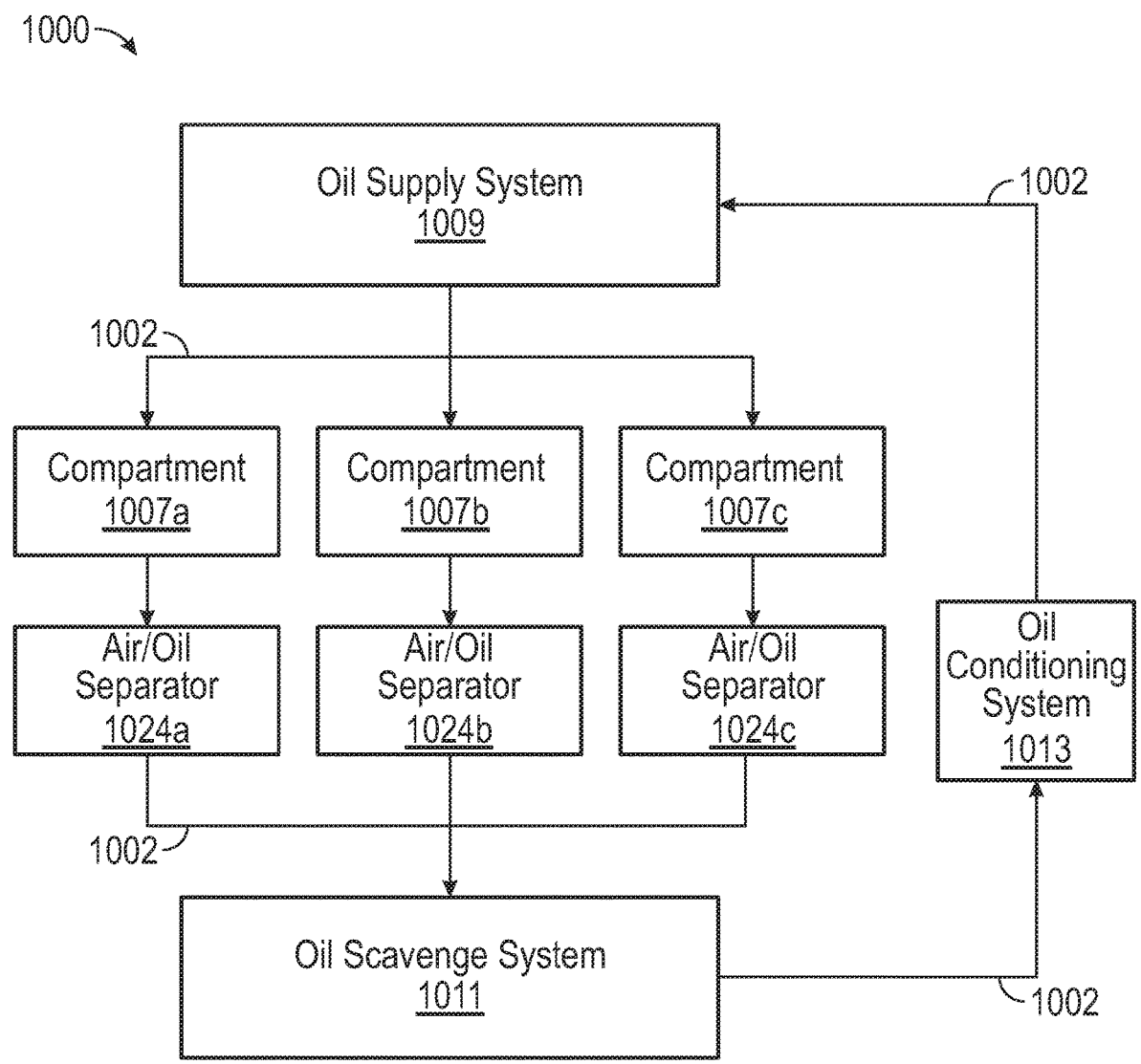
FIG. 10 is a schematic diagram of an oil lubrication system in accordance with an embodiment of the present disclosure.

Turning now to FIG. 10, a schematic illustration of an oil lubrication system 1000 in accordance with an embodiment of the present disclosure is shown. The oil lubrication system 1000 includes a conduit 1002 and a number of compartments 1007a-1007c arranged along the conduit 1002, in parallel (as compared to the series configuration shown in FIG. 7). The compartments 1007a-1007c may be compartments or volumes that receive oil for lubrication (e.g., for dampers, sensors, bearings, etc.), as will be appreciated by those of skill in the art. In operation, an oil supply system 1009 can drive an oil flow from an oil tank of the oil supply system 1009 through the conduit 1002 and into the compartments 1007a-1007c. As the oil is passed through the compartments 1007a-1007c, the oil may accumulate air, thus generating an air/oil mixture at the output of each compartments 1007a-1007c. In this embodiment, each compartment 1007a-1007c is arranged upstream of a respective air/oil separator 1024a-1024c. As such, the output from all of the compartments 1007a-1007c may be refined or de-gassed prior to the oil entering an oil scavenge system 1011. In some embodiments, the air/oil separators 1024a-1024c may be part of the oil scavenge system 1011, and thus the illustrative configuration shown in FIG. 10 is not to be limiting. The oil scavenge system 1011 is configured to receive the oil after air removal at the air/oil separator 1024 and will supply such scavenged oil to an oil conditioning system 1013 and back to the oil supply system 1009.

It will be appreciated that although specific in-conduit air/oil separators as shown and described above (e.g., in FIGS. 7-10), such embodiments are not to be limiting, but are for explanatory and example purposes only. Air/oil separators in accordance with the current disclosure may be arranged or configured to maximize a contact surface between an air/oil mixture and tubes or other surfaces that are permeable to air but not to oil. Thus, twists, spirals, plates, fins, honeycomb structures, etc. may be employed in place of or in addition to the tube assemblies shown and described above. Further, the size and configurations of the in-conduit air/oil separators described herein may be selected to ensure desired pressures, operating temperatures, flow rates, air-content percentages, etc. during operation.

However, it will be appreciated that the passive air extraction described herein, using a membrane style system with air-porous or air-permeable structures eliminates some of the challenges associated with mechanical air/oil separators. For example, such in-conduit systems may be fully functional at all attitudes of flight, all altitudes (and associated pressures and temperatures), during ascent and descent, etc. That is, the systems described herein may be flight operations-independent. The in-conduit systems may be operational and functional at temperatures ranging between about −40° F. and about 430° F. (between about −40° C. and about 221° C.). Further, such systems may be operational at pressures ranging from about ambient to about 450 psi.

Advantageously, improved air/oil separation for gas turbine engines are provided herein. The described systems and processes enable operation at any attitude. This may be achieved by controlling a flow of low-pressure air and a flow of the air/oil mixture (e.g., using an oil pump and/or a vacuum pump). Such control system can allow the air/oil separator systems to retain efficiency as conditions change (e.g., flight, environmental, etc.). By changing flow rates and pressures of both the air/oil mixture flow and the low-pressure air flow, within the degasification system, such control can be reactive to various changes in conditions experienced by the system. Furthermore, because the system can be incorporated in lieu of a section of piping (i.e., integrated directing within a conduit), there is potential for weight reduction as compared to prior systems.

In addition to providing for an efficient air removal within lubrication systems of gas turbine engines, embodiments described herein may provide additional advantages over prior systems. For example, as the air is extracted from the air/oil mixture as it passes through the integrated air/oil separator, heat may also be removed from the oil. That is, the removal of air from the air/oil mixture may also cause a removal of heat or thermal energy from the air/oil mixture, such that a temperature of the fluid (air/oil mixture) as it enters the integrated air/oil separator may be higher than a temperature of the fluid (oil or reduced-air air/oil mixture) that exits the integrated air/oil separator. Such thermal exchange may have positive impacts on a thermal management system such as a reduction in weight and cooler oil temperatures.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An oil lubrication system for use on a gas turbine engine comprising:
   a conduit configured to convey an air/oil mixture therethrough; and
   an air/oil separator connected to the conduit and arranged such that a portion of the conduit fluidly connects to the air/oil separator at an upstream end of the air/oil separator and another portion of the conduit fluidly connects to the air/oil separator at a downstream end of the air/oil separator;
   wherein the air/oil separator comprises:
   a housing; and
   a plurality of tubes arranged within the housing and extending in a direction between the upstream end and the downstream end and defining a semi-permeable divider within the housing, the semi-permeable divider being permeable to air but not oil, wherein the plurality of tubes connect to an inlet at the downstream end of the air/oil separator and an outlet at the upstream end of the air/oil separator,
   wherein the semi-permeable divider separates a first flow path and a second flow path,
   wherein the first flow path is configured to receive and convey the air/oil mixture from a first end of the first flow path at the upstream end of the air/oil separator to a second end of the first flow path at the downstream end of the air/oil separator,
   wherein the second flow path is defined within the plurality of tubes and having a low pressure gas conveyed therethrough, with the low pressure being less than a fluid pressure of the air/oil mixture such that air from the air/oil mixture passes through the semi-permeable divider and is removed from the air/oil mixture, and
   wherein an air-to-oil ratio is less at the second end of the first flow path as compared to the air-to-oil ratio at the first end of the first flow path.

2. The oil lubrication system of claim 1, wherein the semi-permeable divider includes an oleophobic coating.

3. The oil lubrication system of claim 2, wherein the oleophobic coating is a fluoroacrylic copolymer or a perfluoropolyether.

4. The oil lubrication system of claim 1, further comprising a component arranged upstream of the air/oil separator along the conduit, wherein an output of air and oil is directed to the air/oil separator from the component.

5. The oil lubrication system of claim 4, wherein the component is a damper.

6. The oil lubrication system of claim 1, further comprising a plurality of additional air/oil separators arranged along the conduit.

7. The oil lubrication system of claim 1, further comprising:
   an oil pump fluidly connected to the conduit; and
   an oil tank fluidly connected to the conduit,
   wherein an output from the air/oil separator is directed into the oil tank.

8. A gas turbine engine comprising:
   a conduit configured to convey an air/oil mixture therethrough;
   a component arranged along the conduit and configured to receive the air/oil mixture; and
   an air/oil separator connected to the conduit and arranged such that a portion of the conduit fluidly connects to the air/oil separator at an upstream end of the air/oil separator and another portion of the conduit fluidly connects to the air/oil separator at a downstream end of the air/oil separator;
   wherein the air/oil separator comprises:
   a housing; and
   a plurality of tubes arranged within the housing and extending in a direction between the upstream end and the downstream end and defining a semi-permeable divider within the housing, the semi-permeable divider being permeable to air but not oil, wherein the plurality of tubes connect to an inlet at the downstream end of the air/oil separator and an outlet at the upstream end of the air/oil separator,
   wherein the semi-permeable divider separates a first flow path and a second flow path,
   wherein the first flow path is configured to receive and convey the air/oil mixture from a first end of the first flow path at the upstream end of the air/oil separator to a second end of the first flow path at the downstream end of the air/oil separator, wherein the second flow path is defined within the plurality of tubes and having a low pressure gas conveyed therethrough, with the low pressure being less than a fluid pressure of the air/oil mixture such that air from the air/oil mixture passes through the semi-permeable divider and is removed from the air/oil mixture, and wherein an air-to-oil ratio is less at the second end of the first flow path as compared to the air-to-oil ratio at the first end of the first flow path.

9. The gas turbine engine of claim 8, wherein the semi-permeable divider includes an oleophobic coating.

10. The gas turbine engine of claim 9, wherein the oleophobic coating is a fluoroacrylic copolymer or a perfluoropolyether.

11. The gas turbine engine of claim 8, wherein the component is arranged upstream of the air/oil separator along the conduit, and wherein an output of air and oil is directed to the air/oil separator from the component.

12. The gas turbine engine of claim 8, wherein the component is a damper.

13. The gas turbine engine of claim 8, further comprising a plurality of additional air/oil separators arranged along the conduit.

14. The gas turbine engine of claim 8, further comprising:
an oil pump fluidly connected to the conduit; and
an oil tank fluidly connected to the conduit,
wherein an output from the air/oil separator is directed into the oil tank.

* * * * *